(12) United States Patent (10) Patent No.: US 9,117,295 B2
Rastogi et al. (45) Date of Patent: Aug. 25, 2015

(54) REFINEMENT OF DEPTH MAPS BY FUSION OF MULTIPLE ESTIMATES

(75) Inventors: Anubha Rastogi, Noida (IN); Balaji Krishnamurthy, Noida (IN)

(73) Assignee: Adobe Systems Incorporated, San Jose, CA (US)

( * ) Notice: Subject to any disclaimer, the term of this patent is extended or adjusted under 35 U.S.C. 154(b) by 894 days.

(21) Appl. No.: 13/332,139

(22) Filed: Dec. 20, 2011

(65) Prior Publication Data

US 2013/0155050 A1 Jun. 20, 2013

(51) Int. Cl.
G06T 5/50 (2006.01)
G06T 15/40 (2011.01)
G06T 7/00 (2006.01)

(52) U.S. Cl.
CPC . G06T 5/50 (2013.01); G06T 15/40 (2013.01); G06T 2207/10012 (2013.01); G06T 2207/10028 (2013.01); G06T 2207/20221 (2013.01)

(58) Field of Classification Search
CPC combination set(s) only.
See application file for complete search history.

(56) References Cited

PUBLICATIONS

Scharstein, Daniel, and Richard Szeliski. "High-accuracy stereo depth maps using structured light." Computer Vision and Pattern Recognition, 2003. Proceedings. 2003 IEEE Computer Society Conference on. vol. 1. IEEE, 2003.*
Bartczak, Bogumil, and Reinhard Koch. "Dense depth maps from low resolution time-of-flight depth and high resolution color views." Advances in visual computing. Springer Berlin Heidelberg, 2009. 228-239.*
Mordohai, Philippos. "The self-aware matching measure for stereo." Computer Vision, 2009 IEEE 12th International Conference on. IEEE, 2009.*
"Middlebury Stereo Datasets," Daniel Scharstein, Feb. 11, 2011, downloaded from http://vision.middlebury.edu/stereo/data/ on Mar. 21, 2012, 2 pages.
D. Scharstein and R. Szeliski, "A taxonomy and evaluation of dense two-frame stereo correspondence algorithms," International Journal of Computer Vision, 47(1/2/3):7-42, Apr.-Jun. 2002, 35 pages.
D. Scharstein and R. Szeliski, "High-accuracy stereo depth maps using structured light," In IEEE Computer Society Conference on Computer Vision and Pattern Recognition (CVPR 2003), vol. 1, pp. 195-202, Madison, WI, Jun. 2003.
D. Scharstein and C. Pal, "Learning conditional random fields for stereo," In IEEE Computer Society Conference on Computer Vision and Pattern Recognition (CVPR 2007), Minneapolis, MN, Jun. 2007, 8 pages.

(Continued)

*Primary Examiner* — Stephen R Koziol
*Assistant Examiner* — Schiller Hill
(74) *Attorney, Agent, or Firm* — Finch & Maloney PLLC

(57) ABSTRACT

A method, system, and computer-readable storage medium are disclosed for generating fused depth maps. A plurality of initial depth maps are generated for a first image of a stereo pair, using at least two separate and distinct techniques for depth estimation. A plurality of initial depth maps are generated for a second image of the stereo pair, using at least two separate and distinct techniques for depth estimation. A fused depth map is generated for the first image based on the plurality of initial depth maps for the first image and the plurality of initial depth maps for the second image. A fused depth map is generated for the second image based on the plurality of initial depth maps for the second image and the plurality of initial depth maps for the first image.

20 Claims, 8 Drawing Sheets

(56) References Cited

PUBLICATIONS

H. Hirschmüller and D. Scharstein, "Evaluation of cost functions for stereo matching," In IEEE Computer Society Conference on Computer Vision and Pattern Recognition (CVPR 2007), Minneapolis, MN, Jun. 2007, 8 pages.

P. Merrell, A. Akbarzadeh, L. Wang, J. Michael Frahm, and R. Y. D. Nistr, "Real-time visibility-based fusion of depth maps," in Int. Conf. on Computer Vision and Pattern Recognition (ICCV 2007), Oct. 2007. pp. 1-8.

* cited by examiner

Left-Hand Depth Map 610  Right-Hand Depth Map 612

Left-Hand Depth Map 710  Right-Hand Depth Map 712

Fused Left-Hand Depth Map 810

Final Left-Hand Depth Map 910

REFINEMENT OF DEPTH MAPS BY FUSION OF MULTIPLE ESTIMATES

BACKGROUND

1. Field of the Invention

The present invention is directed to computer systems; and more particularly, it is directed to digital imaging.

2. Description of the Related Art

Digital images may include raster graphics, vector graphics, or a combination thereof. Raster graphics data (also referred to herein as bitmaps) may be stored and manipulated as a grid of individual picture elements called pixels. A bitmap may be characterized by its width and height in pixels and also by the number of bits per pixel. Commonly, a color bitmap defined in the RGB (red, green blue) color space may comprise between one and eight bits per pixel for each of the red, green, and blue channels. An alpha channel may be used to store additional data such as per-pixel transparency values. Vector graphics data may be stored and manipulated as one or more geometric objects built with geometric primitives. The geometric primitives (e.g., points, lines, polygons, Bézier curves, and text characters) may be based upon mathematical equations to represent parts of digital images.

Digital image processing is the process of analyzing and/or modifying digital images using a computing device, e.g., a computer system. Using specialized software programs, digital images may be manipulated and transformed in a variety of ways. For manipulating and transforming images in a three-dimensional domain, depth information for pixels or objects in the image may be needed. When images are rendered in a three-dimensional domain based on a description of the elements of the image (e.g., geometric primitives), the depth information may be generated along with the color information. However, when images are instead acquired without per-pixel or per-object depth information, it is desirable to estimate such depth information through analysis of the images.

For example, in estimating depth information for a left-eye view and a right-eye view of the same scene (i.e., a stereo pair), prior approaches have typically formulated the problem in terms of finding the global minimum of an appropriate energy function. Global optimization techniques like cooperative optimization, graph cut, and belief propagation have been proposed to minimize the energy function. However, the typical prior approaches have either produced low-quality results or been computationally expensive.

SUMMARY

Various embodiments of systems, methods, and computer-readable storage media for generating fused depth maps are disclosed. A plurality of initial depth maps may be generated for a first image of a stereo pair. The plurality of initial depth maps for the first image may be generated using at least two separate and distinct techniques for depth estimation. A plurality of initial depth maps may be generated for a second image of the stereo pair. The plurality of initial depth maps for the second image may be generated using at least two separate and distinct techniques for depth estimation. In one embodiment, the initial depth maps may be generated by any of various techniques, such as by matching segmented horizontal scanlines and segmented vertical scanlines from one member of the stereo pair to the other member of the stereo pair.

A fused depth map may be generated for the first image based on the plurality of initial depth maps for the first image and the plurality of initial depth maps for the second image. A fused depth map may be generated for the second image based on the plurality of initial depth maps for the second image and the plurality of initial depth maps for the first image. To generate the fused depth maps, weights may be assigned to pixels in the initial depth maps based on criteria such as a smoothness criterion and/or a confirmation criterion. Depth values associated with the highest weights may then be selected for inclusion in the fused depth maps.

Figure 1:
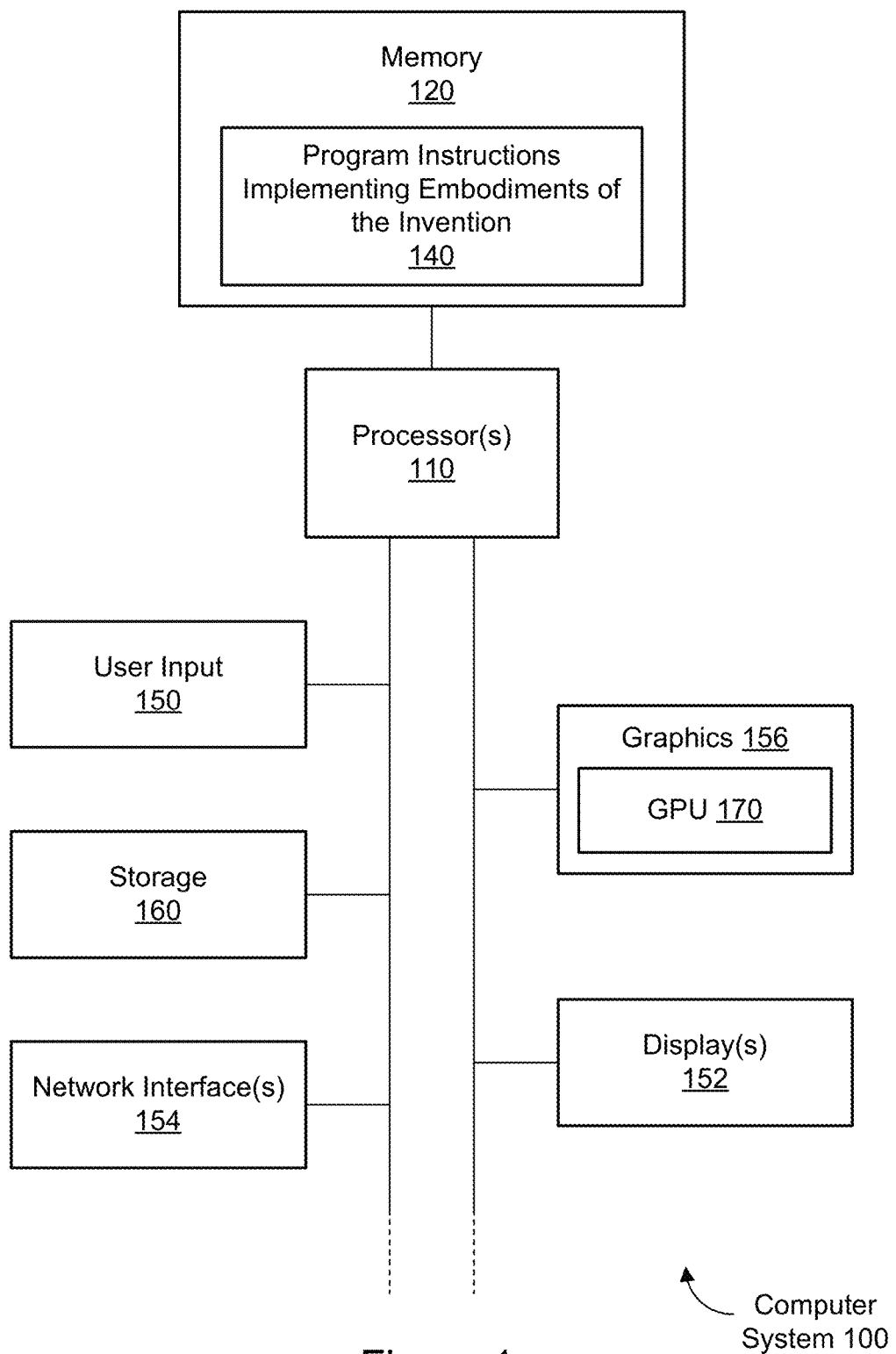
FIG. 1 is a block diagram of an example system configured to implement embodiments.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Embodiments of the systems and methods described herein may be used to generate fused depth maps for digital images. FIG. 1 is a block diagram illustrating constituent elements of a computer system 100 that is configured to implement embodiments of the systems and methods described herein. The computer system 100 may include one or more processors 110 implemented using any desired architecture or chip set, such as the SPARC™ architecture, an x86-compatible architecture from Intel Corporation or Advanced Micro Devices, or an other architecture or chipset capable of processing data. Any desired operating system(s) may be run on the computer system 100, such as various versions of Unix, Linux, Windows® from Microsoft Corporation, MacOS® from Apple Inc., or any other operating system that enables the operation of software on a hardware platform. The processor(s) 110 may be coupled to one or more of the other illustrated components, such as a memory 120, by at least one communications bus.

In one embodiment, a specialized graphics card or other graphics component 156 may be coupled to the processor(s) 110. The graphics component 156 may include a graphics processing unit (GPU) 170, which in some embodiments may be used to perform at least a portion of the techniques described below. Additionally, the computer system 100 may include one or more imaging devices 152. The one or more imaging devices 152 may include various types of raster-based imaging devices such as monitors and printers. In one embodiment, one or more display devices 152 may be coupled to the graphics component 156 for display of data provided by the graphics component 156.

In one embodiment, program instructions 140 that may be executable by the processor(s) 110 to implement aspects of the techniques described herein may be partly or fully resident within the memory 120 at the computer system 100 at any point in time. The memory 120 may be implemented using any appropriate medium such as any of various types of ROM or RAM (e.g., DRAM, SDRAM, RDRAM, SRAM, etc.), or combinations thereof. The program instructions may also be stored on a storage device 160 accessible from the processor(s) 110. Any of a variety of storage devices 160 may be used to store the program instructions 140 in different embodiments, including any desired type of persistent and/or volatile storage devices, such as individual disks, disk arrays, optical devices (e.g., CD-ROMs, CD-RW drives, DVD-ROMs, DVD-RW drives), flash memory devices, various types of RAM, holographic storage, etc. The storage 160 may be coupled to the processor(s) 110 through one or more storage or I/O interfaces. In some embodiments, the program instructions 140 may be provided to the computer system 100 via any suitable computer-readable storage medium including the memory 120 and storage devices 160 described above.

The computer system 100 may also include one or more additional I/O interfaces, such as interfaces for one or more user input devices 150. In addition, the computer system 100 may include one or more network interfaces 154 providing access to a network. It should be noted that one or more components of the computer system 100 may be located remotely and accessed via the network. The program instructions may be implemented in various embodiments using any desired programming language, scripting language, or combination of programming languages and/or scripting languages, e.g., C, C++, C#, Java™, Perl, etc. The computer system 100 may also include numerous elements not shown in FIG. 1, as illustrated by the ellipsis.

In one embodiment, a plurality of depth estimates may be fused or patched together to obtain a more accurate depth map. The initial depth estimates may be of relatively low quality but may be generated or otherwise acquired in a computationally inexpensive manner. In some embodiments, the initial depth estimates may be acquired from depth sensors such as laser range finders, ultrasound range finders, or other suitable hardware. Different portions of the initial depth estimates may be selected for inclusion in the fused depth map based on a reliability criterion corresponding to the smoothness of the different portions.

Figure 2:
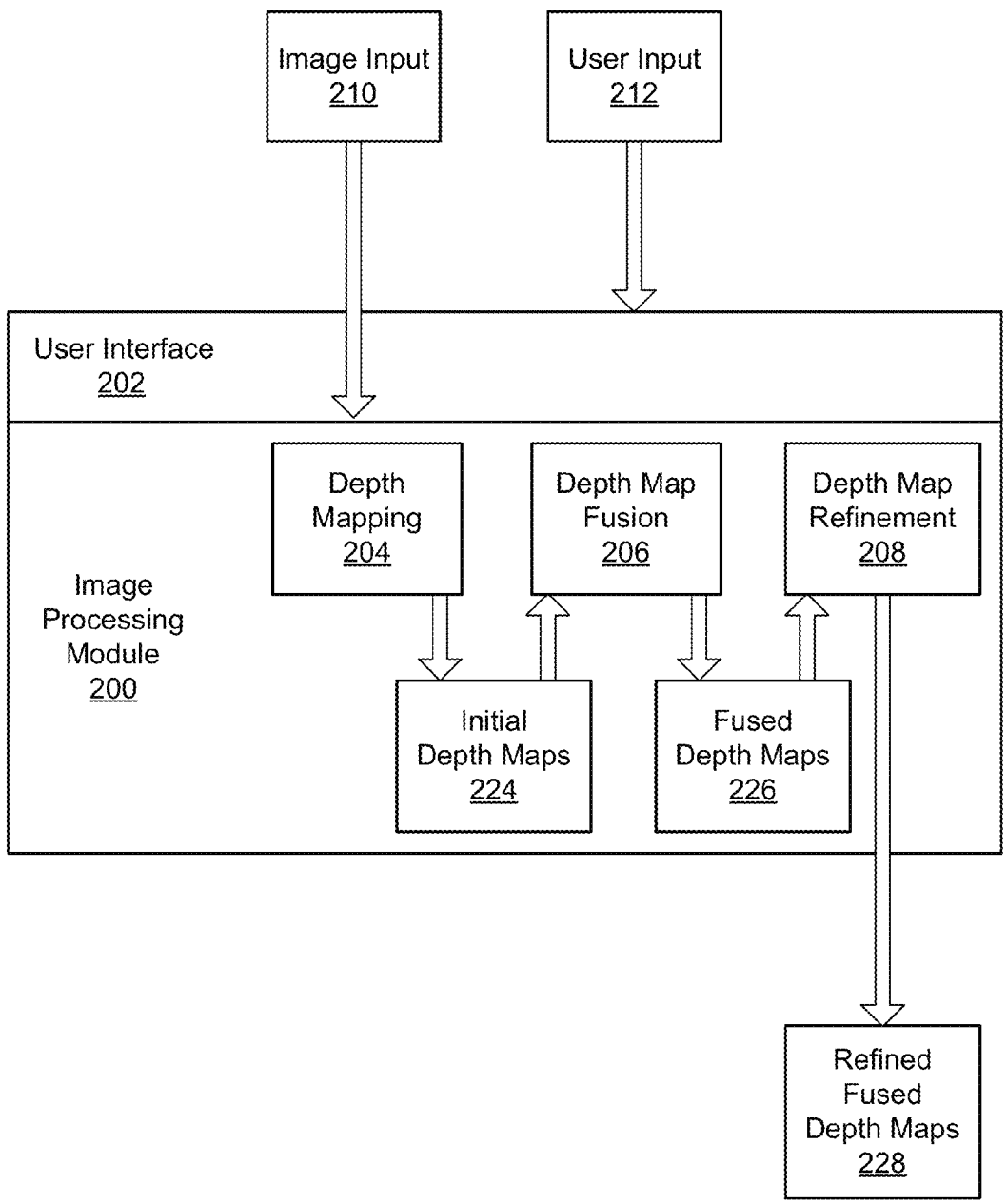
FIG. 2 illustrates an example of an image processing module configured for generating fused depth maps, according to one embodiment.

FIG. 2 illustrates an example image processing module that may implement embodiments of methods for generating fused depth maps. In one embodiment, module 200 may provide a user interface 202 that includes one or more user interface elements via which a user may initiate, interact with, direct, and/or control the methods performed by module 200. Module 200 may obtain image input 210. In one embodiment, the image input 210 may comprise a stereo pair: a left-eye view and a right-eye view of the same scene. In one embodiment, the image input 210 may comprise a plurality of images representing different views of the same scene. In various embodiments, the image input 210 may comprise two-dimensional (2D) graphical elements, three-dimensional (3D) graphical elements, or a combination thereof. In various embodiments, the image input 210 may comprise raster graphical elements, vector graphical elements, or a combination thereof.

In one embodiment, module 200 may also obtain user input 212, such as one or more instructions to perform the method for generating fused depth maps. In various embodiments, the generation of fused depth maps may be initiated by user input, by a configuration of the image processing module 200 itself (i.e., automatically initiated), or by one or more instructions received by the image processing module 200 from another module.

As will be described below in greater detail, depth mapping techniques may be applied to the image input 210 to generate one or more depth maps. A depth mapping module 204 may be used to generate a plurality of initial depth maps 224 (also referred to herein as initial depth estimates). A depth map fusion module 206 may be used to fuse the initial depth maps 224 to generate a plurality of fused depth maps 226. In one embodiment, the module 200 may produce the fused depth maps 226 as its final output. A depth map refinement module 208 may be used to further refine the fused depth maps 226 to produce a plurality of refined fused depth maps 228. As shown in FIG. 2, where refinement of the fused depth maps is desired, the module 200 may produce the refined fused depth maps 228 as its final output. In one embodiment, the process performed by the depth mapping module 204 may be performed automatically and/or programmatically. In one embodiment, the process performed by the depth map fusion module 206 may be performed automatically and/or programmatically. In one embodiment, the process performed by the depth map refinement module 208 may be performed automatically and/or programmatically. The operations performed by the depth mapping module 204, depth map fusion module 206, and depth map refinement module 208 are described in greater detail below.

Image processing module 200 may be implemented as or in a stand-alone application or as a module of or plug-in for an image processing and/or presentation application. Examples of types of applications in which embodiments of module 200 may be implemented may include, but are not limited to, image editing, processing, and/or presentation applications, as well as applications in security or defense, educational, scientific, medical, publishing, digital photography, digital films, games, animation, marketing, and/or other applications in which digital video image editing or presentation may be performed, e.g., where operations are to be directed to different layers of images or to three-dimensional images. Specific examples of applications in which embodiments may be implemented include, but are not limited to, Adobe®Photoshop® and Adobe® Illustrator®. In addition to generating the initial depth maps 224, fused depth maps 226, and refined fused depth maps 228, module 200 may be used to display, manipulate, modify, and/or store any of the depth maps, for example to a memory medium such as a storage device or storage medium.

In creating a stereo image for the image input 210, two cameras may be used to capture an image of the same scene. Typically, the two cameras are parallel to each other and have the same focal length. The two cameras may be referred to as stereo cameras. Each of the two cameras may generate a separate image. The two images may correspond to a left-eye view and a right-eye view of the same scene. A pixel or object in one image may be horizontally displaced with respect to a corresponding pixel or object in other image. The displacement or disparity is the difference between the horizontal positions of a pixel or object in the paired images. The displacement is inversely proportional to the distance from the camera. In other words, objects that are closer to the camera have a larger displacement, and objects that are farther away have a smaller displacement. The distance of an object from the camera corresponds to the depth of the object in the scene. Using the systems and methods described herein, an estimation of the depth information may be generated for a plurality of pixels in a stereo image. The depth information may be used for creating a three-dimensional view of the scene and for manipulation of the image.

Figure 3:
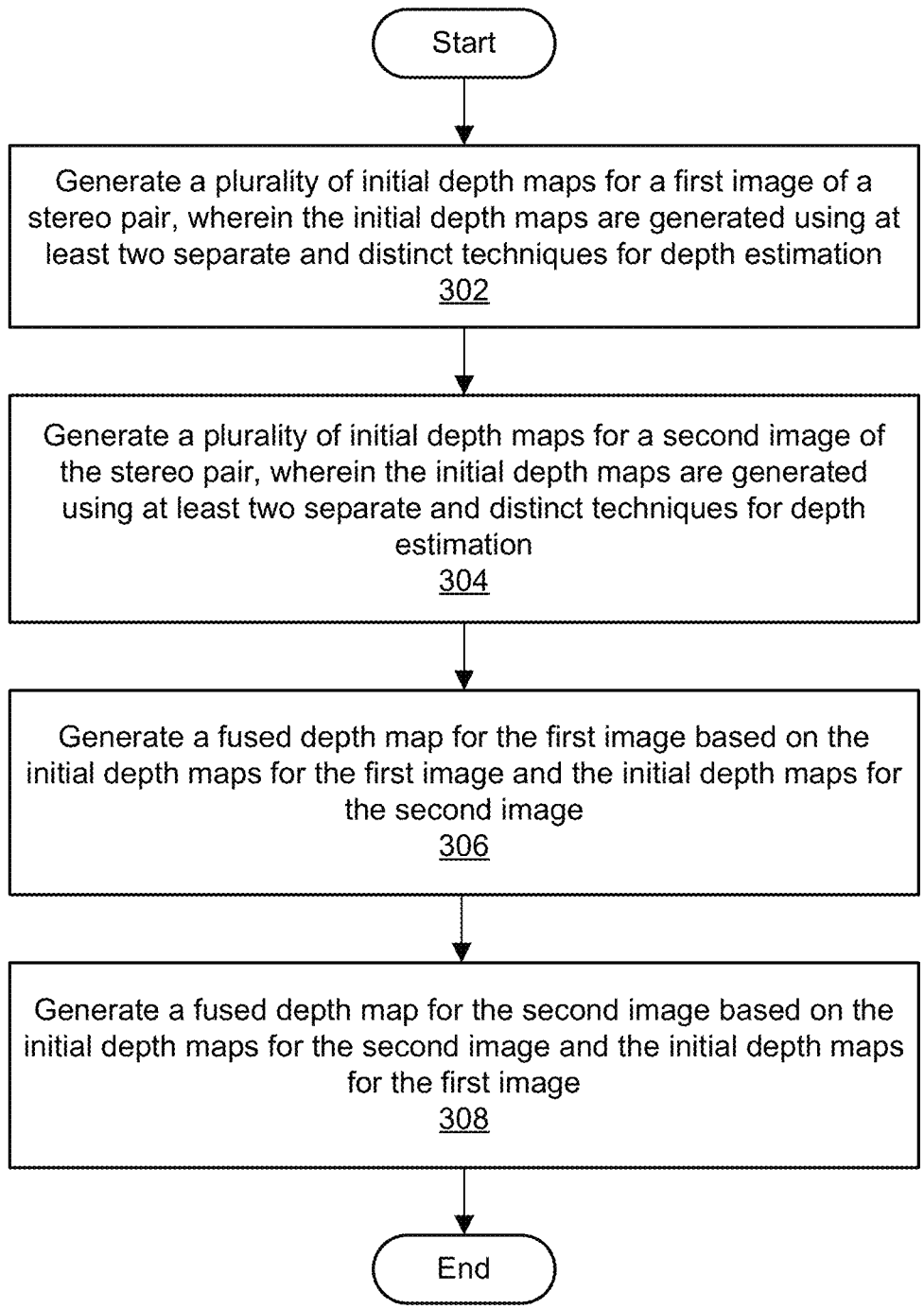
FIG. 3 is a flowchart illustrating a method for generating fused depth maps, according to one embodiment.

FIG. 3 is a flowchart illustrating a method for generating fused depth maps, according to one embodiment. The method shown in FIG. 3 may be used in conjunction with embodiments of the computer system shown in FIG. 1, among other devices. In various embodiments, some of the method elements shown may be performed concurrently, in a different order than shown, or may be omitted. Additional method elements may also be performed as desired. Any of the method elements described may be performed automatically (i.e., without user intervention). As shown, this method may operate as follows.

As shown in block 302, a plurality of initial depth maps are generated for a first image of a stereo pair. The plurality of initial depth maps for the first image are generated using at least two separate and distinct techniques for depth estimation. As shown in block 304, a plurality of initial depth maps are generated for a second image of the stereo pair. The plurality of initial depth maps for the second image are generated using at least two separate and distinct techniques for depth estimation. In one embodiment, the depth estimation techniques used for the first image may vary from the depth estimation techniques used for the second image. In one embodiment, the depth estimation techniques used for the first image may also be used for the second image. As shown in block 306, a fused depth map is generated for the first image based on the plurality of initial depth maps for the first image and the plurality of depth maps for the second image (via projection). As shown in block 308, a fused depth map is generated for the second image based on the plurality of initial depth maps for the second image and the plurality of initial depth maps for the first image (via projection). The operations shown in blocks 302-308 are described in greater detail below.

In generating depth maps, an initial estimate of disparity may first be determined. For a pixel in the first image of a stereo pair, the parallel placement of the two cameras may guarantee that the corresponding pixel in the second image is located on the same scanline in both images. A best matching pixel may be determined in the second image by analyzing the corresponding scanline in the second image. The horizontal distance between the corresponding pixels may be the displacement. The displacement information for each pixel may be used to create a depth map.

In finding the corresponding pixel, prior approaches have begun by guessing the location of the corresponding pixel on the scanline, such as by finding the pixel that is closest in color. The pixel with the minimum color difference may be selected as an initial guess at the corresponding pixel. The initial guess may then be refined as many times as desired. However, repeating patterns, uniformly colored areas, and occlusions within the image may complicate the estimation. Accordingly, the resulting depth maps may include errors and/or areas that lack depth information. By fusing and optionally refining depth maps as described herein, such errors and/or empty areas may be reduced to create more accurate depth maps.

Figure 4:
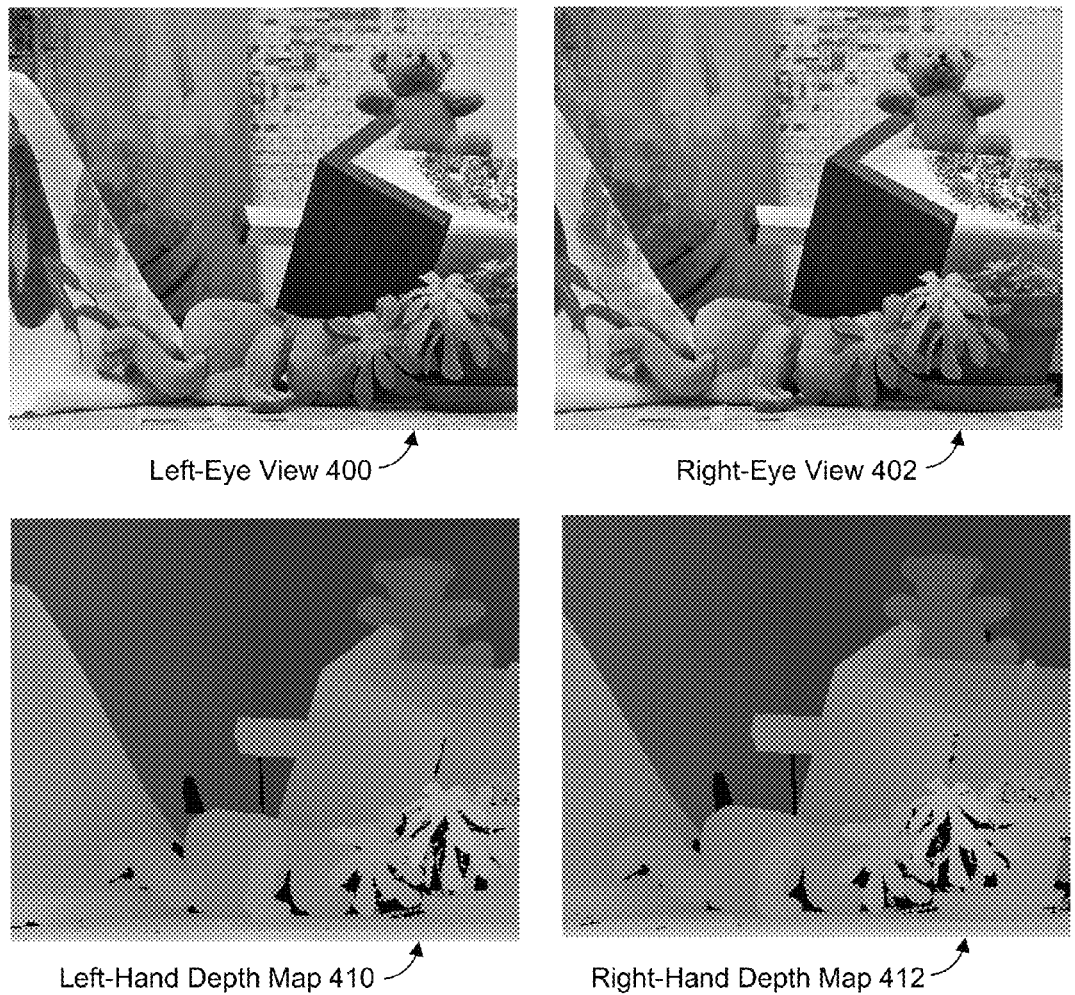
FIG. 4 illustrates an example of a stereo pair and a corresponding pair of depth maps, according to one embodiment.

FIG. 4 illustrates an example of a stereo pair and a corresponding pair of depth maps, according to one embodiment. The depth maps 410 and 412 as shown in FIG. 4 are examples of initial depth maps (i.e., initial depth estimates) that may be fused and optionally refined as described herein. The depth maps 410 and 412 may be generated using any suitable technique. The left-eye view of the stereo image 400 corresponds to the left-hand depth map 410, and the right-eye view of the stereo image 402 corresponds to the right-hand depth map 412. In the example depth maps 410 and 412, the areas that are lighter in intensity are closer to the camera, and the areas that are darker in intensity are farther from the camera. Areas that are black may lack depth information.

Figure 5:
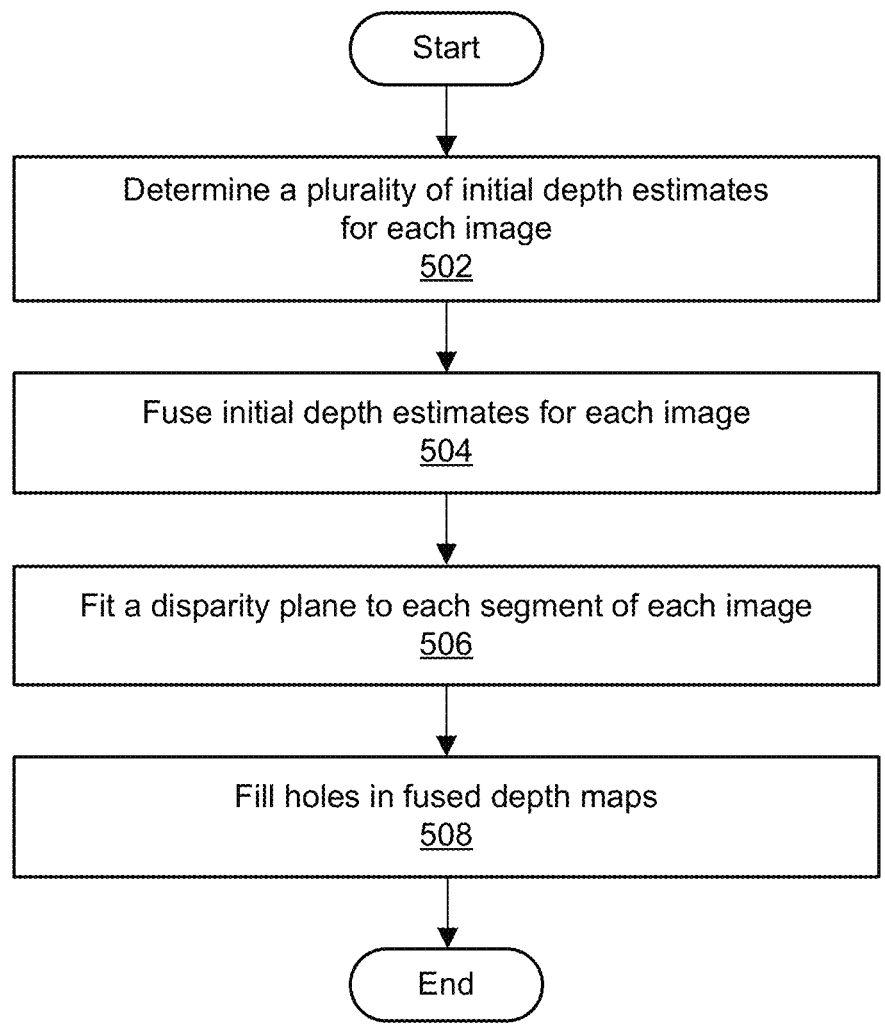
FIG. 5 is a flowchart illustrating further aspects of a method for generating fused depth maps, according to one embodiment.

FIG. 5 is a flowchart illustrating further aspects of a method for generating fused depth maps, according to one embodiment. The method shown in FIG. 5 may be used in conjunction with embodiments of the computer system shown in FIG. 1, among other devices. In various embodiments, some of the method elements shown may be performed concurrently, in a different order than shown, or may be omitted. Additional method elements may also be performed as desired. Any of the method elements described may be performed automatically (i.e., without user intervention). As shown, this method may operate as follows.

As shown in block 502, a plurality of initial depth estimates or depth maps may be determined for each of the two images in the pair. In various embodiments, any suitable number of initial depth estimates may be generated. In various embodiments, any suitable techniques may be used for generating the initial depth estimates. Each technique used for generating the initial depth estimates may be associated with its own error characteristics. By generating the initial depth estimates using different techniques having different error characteristics and then selecting the most accurate portions of each depth estimate, a higher-quality depth estimate may be generated.

Figure 6:
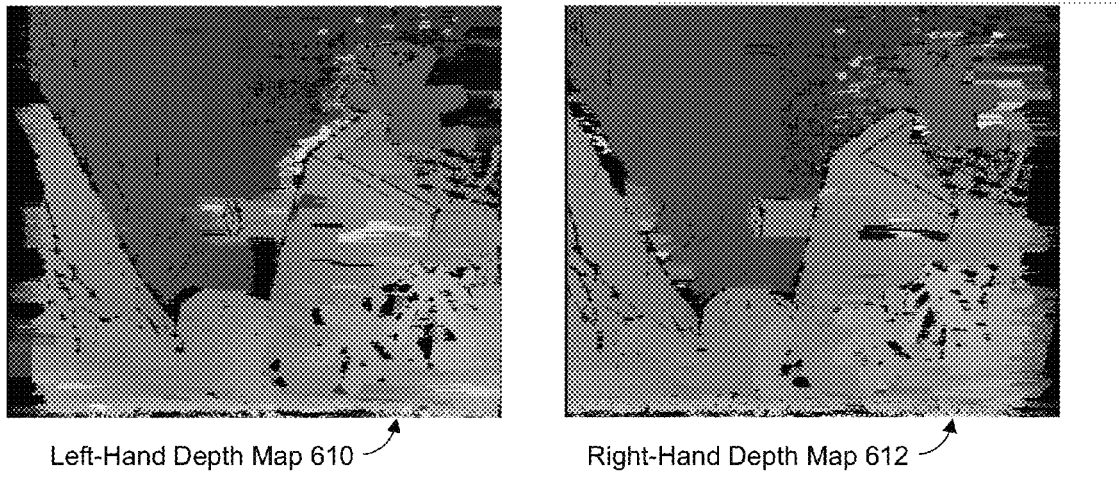
FIG. 6 illustrates an example of a pair of depth maps generated using horizontal scanlines, according to one embodiment.

In one embodiment, the initial depth estimates may be determined based on segmented horizontal scanlines. A horizontal scanline in the first image may be segmented into a plurality of segments. Each segment may contain one or more contiguous pixels that are similar in color. An entire segment in the first image may be matched to a region in the second image by shifting a window having the same width as the segment across the scanline in the second image. The window on the scanline in the second image may be shifted by a small amount, such as one pixel at a time, until a best match is found for the segment. The displacement or disparity is the difference in position between the start of the segment in the first image and the start of the matching window in the second image. The disparity that minimizes the color matching cost may be assigned to the segment. In this manner, a depth estimate (i.e., a depth map) based on horizontal scanlines may be generated for the left-eye image, and a depth estimate (i.e., a depth map) based on horizontal scanlines may be generated for the right-eye image. FIG. 6 illustrates an example of a pair of depth maps 610 and 612 generated using horizontal scanlines based on stereo pair 400 and 402, according to one embodiment. The pair of depth maps shown in FIG. 6 includes a left-hand depth map 610 and a right-hand depth map 612.

Figure 7:
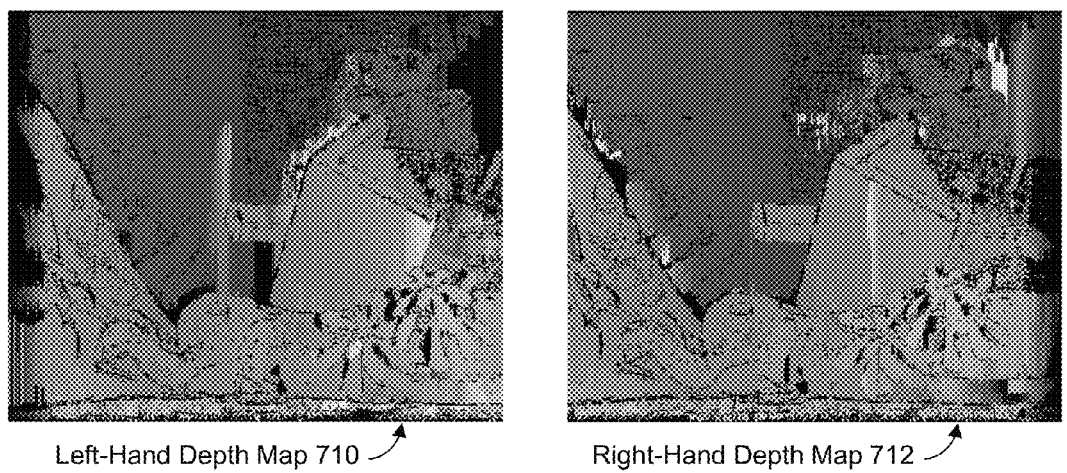
FIG. 7 illustrates an example of a pair of depth maps generated using vertical scanlines, according to one embodiment.

In one embodiment, an initial set of depth estimates may be determined using segmented vertical scanlines. Each vertical scanline in the first image may be segmented into areas of similar color as described above with respect to horizontal scanlines. For each vertical segment in the first image, the corresponding vertical window may be shifted horizontally in the second image to find a best match. In this manner, a depth estimate (i.e., a depth map) based on vertical scanlines may be generated for the left-eye image, and a depth estimate (i.e., a depth map) based on vertical scanlines may be generated for the right-eye image. FIG. 7 illustrates an example of a pair of depth maps 710 and 712 generated using vertical scanlines based on stereo pair 400 and 402, according to one embodiment. The pair of depth maps shown in FIG. 7 includes a left-hand depth map 710 and a right-hand depth map 712.

In one embodiment, depth estimates may be generated using both horizontal segmentation and vertical segmentation as described above. Because horizontal segmentation may enable the disparity to differ in the vertical direction while vertical segmentation may enable the disparity to differ in the horizontal direction, a combination of both may be used to detect a sloping object. In one embodiment, rather than using a stereo pair, a plurality of images may be used, where the plurality of images represent a plurality of views of the same scene. The plurality of images representing a plurality of views of the same scene may be taken by the same camera in a plurality of different positions.

Figure 8:
FIG. 8 illustrates an example of a fused left-hand depth map, according to one embodiment.

Turning back to FIG. 5, as shown in block 504, the initial depth estimates may be fused together to generate a more accurate depth estimate (e.g., a fused depth estimate) for each image. The operation shown in block 504 may be referred to as disparity refinement. At least two initial depth estimates may be fused for each image. The initial depth estimates may include both correct depths and incorrect depths. Therefore, the initial depth estimates may be fused to obtain the best depth estimate for each pixel from among the initial depth estimates. In fusing the depth estimates, the estimate that fits more smoothly with its neighbors may be selected since neighboring pixels are likely to belong to the same object. For purposes of selecting the best depth estimates, a pixel belongs to a smooth area if similarly colored pixels in its neighborhood have similar depths. Smooth areas may be assigned a higher weight than non-smooth areas based on a smoothness criterion. A weight may also be assigned to an estimate if a pixel, when projected from the second view, has a similar depth value as the pixel onto which it is projected. Accordingly, depth estimates that are in agreement with one another may be assigned a higher weight based on a confirmation criterion. All the weights from all the initial estimates may be accumulated, and the disparity having the highest weight may be selected for the pixel. FIG. 8 illustrates an example of a fused left-hand depth map 810, according to one embodiment.

In one embodiment, the depth estimate may be further refined. The fused depth estimate may include incorrect depth estimates as well as pixels that lack a depth estimate. Therefore, various refinement techniques may be used. Refinement techniques may include graph cut, belief propagation, and other suitable techniques. In one embodiment, for example, a disparity plane may be fit to segments in the image, as shown in block 506. The image may be segmented based on color. Each segment may comprise a set of one or more pixels (often a plurality of pixels) that are contiguous and similar in color. A segment may extend both horizontally and vertically. It may be assumed that a segment, having pixels of a similar color, is likely to belong to a single object. A plane may be fit to each segment to achieve a smooth depth map. To fit a plane to each segment, a histogram of the disparities of the pixels in the segment may be generated. Since a disparity plane is continuous, the largest continuous region of the histogram is considered to be the inlier set. The remaining disparities are considered to be outliers and are discarded. A plane may be fit to the inlier set using a weighted least squares technique. In this manner, errors in the segment may be eliminated. Additionally, a depth estimate may be extrapolated to pixels which previously lacked a depth estimate.

Figure 9:
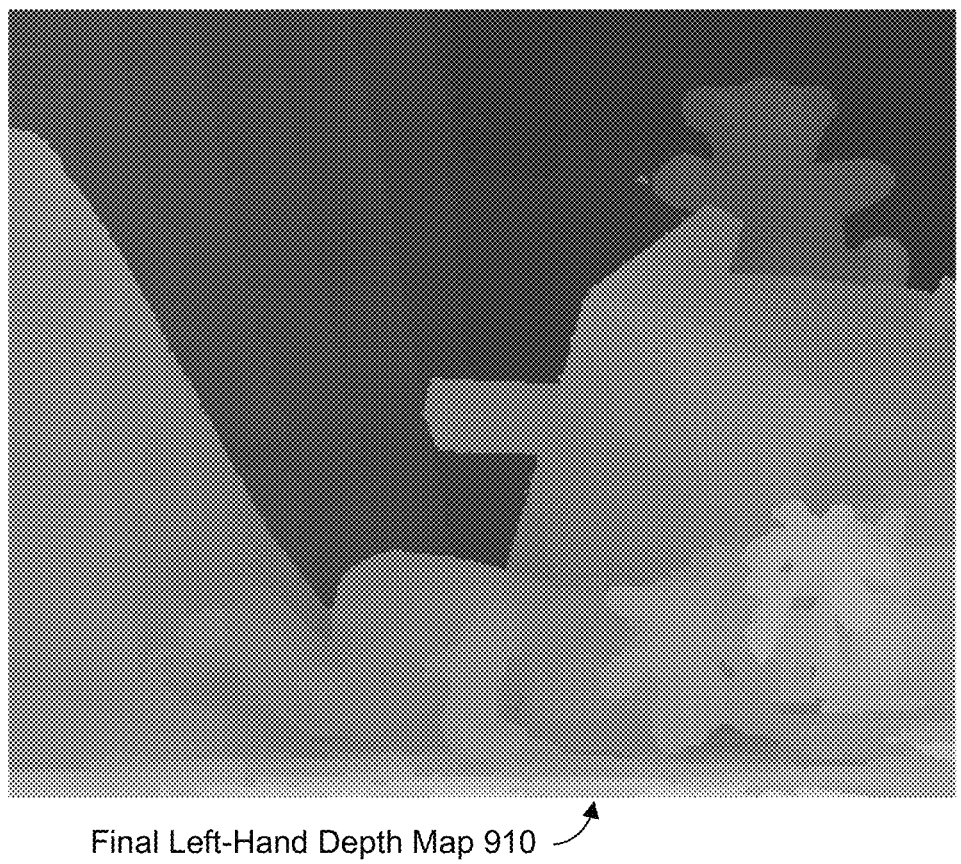
FIG. 9 illustrates an example of a final left-hand depth map resulting from fusion and refinement, according to one embodiment.

Even after the operations discussed above, some pixels in the fused depth maps may lack depth information. As shown in block 508, any holes in the fused depth maps may be filled. In one embodiment, the holes may be filled by looking for similarly colored areas within the same image. For each pixel that lacks depth information, a neighborhood of pixels around the pixel is matched to an area of pixels that has depth information. The disparity value may be extrapolated to the hole by using the plane parameters determined in block 506. FIG. 9 illustrates an example of a final left-hand depth map 910 in which the holes have been filled. The final left-hand depth map 910 may comprise a refined fused depth map.

The depth estimate determined according to the systems and methods described herein may be used in any suitable image editing operation that is part of a stereo workflow. For example, an image may be refocused using a lens blur filter and the fused depth map. As another example, shadows for new objects or existing objects may be added to an object using the fused depth map, wherein the shadows realistically warp around the contours of the objects in the image. As yet another example, a three-dimensional cursor (e.g., a cursor that moves in depth) may be generated for editing the image using the fused depth map.

In one embodiment, the fusion operation referenced in block 504 may be performed as follows. Assume that the input images are rectified and the disparity range $[d_{min}, d_{max}]$ is known. In one embodiment, rectification is the process by which the two views are transformed such that the corresponding pixels in the transformed images lie along the same scan line. Therefore, after rectification, a pixel at location (x,y) in one view will have a corresponding point at some (t,y) on the other view. Let $D_m = \max(|d_{min}|, |d_{max}|)$ be the largest absolute disparity. The images are assumed to be in RGB color space, and the color values have been normalized to lie in the [0, 1] range. Let $d_{rv}^i$ and $d_{sv}^i$, for i=1, ..., m, be m initial depth maps for the reference view (e.g., the first image) and the second view (e.g., the second image in a stereo pair) respectively. As discussed above, the initial depth estimates may have been generated or otherwise obtained using any number of different techniques. Any of the depth estimates may not be complete, and some pixels may lack a valid depth estimate. The goal of the fusion operation is to obtain better quality depth maps $\tilde{d}_{rv}$ and $\tilde{d}_{sv}$ for the reference view and the second view.

The presence of a significant variation in depth without a variation in color between two neighboring pixels may signal an error in the depth estimate since neighboring pixels of similar color are likely to belong to the same object. However, neighboring pixels may have significant variation in color without also having a variation in depth since an object can have more than one color. The presence of many such errors in a neighborhood of a pixel may indicate that the depth estimate at that location is unreliable. The depth estimate usually looks very noisy in such unreliable areas. The fusion operation described herein makes use of this observation by assigning a lower weight to such noisy areas and a higher weight to smooth areas.

The following equations use Iversonian bracket notation, such that, given a predicate L, [L] evaluates to 1 if a predicate L is true and 0 otherwise. For a depth estimate $d_{rv}^i$ of the reference image R, there exists a depth variation between two pixels p and r if the difference in their depth estimates is larger than a threshold $\delta$:

$$D_{rv}^i(p,r) = [|d_{rv}^i(p) - d_{rv}^i(r)| \geq \delta] \quad (1)$$

There exists a color variation between two pixels p and r if the difference in their color values (R, representing RGB values) is larger than a threshold $\tau$:

$$C_{rv}^i(p,r) = [\|R(p) - R(r)\| \geq \tau] \quad (2)$$

Let N(p) be a set of pixels with a valid depth estimate in a neighborhood around p. Let n be the size of N(p). The smoothness of the depth estimate $d_{rv}^i$ at p is defined as:

$$S_{rv}^i(p) = 1 - \frac{1}{n}\sum_{j \in N(p)} \frac{1}{s_j} \sum_{k \in M(j)} D^i(j,k)(1 - C^i(j,k)) \quad (3)$$

where M(j) is the set of four immediate neighbors of pixel j with a valid depth estimate, and $s_j$ is the number of pixels in M(j). In one embodiment, the smoothness $S_{rv}^i(p)$ is a value between 0 and 1. The smoothness represents the fraction of pixels in a neighborhood of p that are do not exhibit a variation in depth without a variation in color. The neighborhood may be any suitable size, such as, for example, a window of 5 by 5 pixels.

The availability of depth estimates for the second view provides another set of depth estimates for each pixel of the reference view, because the depth of a pixel in the second view may be projected to the reference view. The aforementioned criterion for smoothness of a depth estimate may apply to the depth estimate of the second view as well. Further, if a depth estimate $d_{rv}^i$ of the reference view at a pixel p is cross-validated by any of the m estimates $d_{sv}^j$ of the second view, it increases the confidence of the estimate $d_{rv}^i$ at p. Let $d = d_{rv}^i(p)$. Let q→p denote that a pixel q from the second view projects to p in the reference view, via the depth estimate $d_{sv}^j$ of the second view. The cross-validation of the estimate $d_{rv}^i$ at p may be defined as:

$$V_p(d_{rv}^i) = \begin{cases} 1 & \text{if } \left(\sum_{j=1}^{m} \sum_{q \to p} [|d_{sv}^j(q) - d| < \delta]\right) > 0 \\ 0 & \text{otherwise} \end{cases} \quad (4)$$

Note that more than one pixel q from the second view can project to p via a depth estimate due to errors or the presence of occlusions. The inner summation in the condition of equation 4 takes this observation into account.

The smoothness notion and the cross-validation described above may allow the attachment of a reliability value for each possible depth value $d_{min} \leq d \leq d_{max}$ at each pixel p of the reference image in the following way:

$$R_p(d) = \sum_{i=1}^{m} [d_{rv}^i(p) = d]S_{rv}^i(p) + \sum_{j=1}^{m}\sum_{q \to p} [d_{sv}^j(q) = d]S_{sv}^j(q) + \alpha \sum_{i=1}^{m}[d_{rv}^i(p) = d]V_p(d_{rv}^i) \quad (5)$$

where $\alpha$ is a weighting factor.

The reliability values $R_p(d)$ for each disparity d may be accumulated and smoothed. The smoothing operation is defined as:

$$G_p(d) = \sum_{i=-\sigma}^{\sigma} \frac{1}{1+|i|} R_p(d+i) \quad (6)$$

where $\sigma$ is a parameter that is used to control the extent of smoothing that is to be performed. The depth d for which $G_p(d)$ is maximized may be chosen as the depth value $\tilde{d}$ for pixel p, provided $G_p(\tilde{d})$ is greater than a threshold $\kappa$. Otherwise, no depth value is assigned to pixel p. In one embodiment, the parameter values used are $\delta = D_m/32$, $\tau = 0.05$, $\alpha = 1$, $\kappa = m$, and $\sigma = D_m/17$.

Tables 1-8 show results of experiments performed using the fused depth mapping methods described herein in comparison to three prior approaches. Approaches 1, 2, and 3 are based on techniques proposed in P. Merrell, A. Akbarzadeh, L. Wang, J. Michael Frahm, and R. Y. D. Nistr, "Real-time visibility-based fusion of depth maps," in *Int. Conf on Computer Vision and Pattern Recognition,* 2007. Approach 1 represents a median of depths approach. Approach 2 represents a median of costs approach. Approach 3 represents a confidence-based approach. In Approach 3, the confidence measure C(x) of a depth estimate $d_0$ at a pixel x was determined as:

$$C(x) = \left( \sum_{d \neq d_0} e^{-(c(x,d)-c(x,d_0))^2/\sigma^2} \right)^{-1} \quad (7)$$

where c(x, d) is the matching cost for depth d at x, the costs are normalized to lie between 0 and 1, the value of the parameters $\sigma$=120, and the threshold value $C_{Thres}$ is used to be ⅓ of the total number of input depth estimates.

Approach 4 comprises one implementation of the method for generating fused depth maps as described herein. In Approach 4, initial depth estimates were generated using an efficient stereo-matching algorithm, a constant-space belief-propagation algorithm, and a scanline-based stereo-matching algorithm. In the scanline-based stereo-matching algorithm, each scanline was segmented into areas of homogeneous color. Each segment was assigned a single disparity. Instead of the full disparity range, a restricted set of the disparities previously assigned to the neighboring segments was considered, and the disparity value was determined based on the smallest per pixel matching cost in the restricted set. If it was less than a threshold $\tau_c$, the value of that disparity was assigned to the entire segment. If not, the disparity in the full range that minimizes the per pixel matching cost of the entire segment was chosen. The algorithm was performed independently on horizontal scan lines as well as vertical scan lines. A value of $\tau_c$=0.05 was used for these experiments.

The four approaches were tested on various images of the Middlebury data set as well as other real world images. As shown in tables 1-8, the method for generating fused depth maps as described herein was able to significantly decrease the errors in depth estimates as compared to the inputs. Errors in the depth maps were tabulated as a percentage of the pixels for which a disparity estimate was output as well as the percentage of image area that was assigned a final depth estimate.

Table 1 shows the error in the entire image including the occluded regions. The error is computed as the percentage of pixels of the covered area differing from the ground truth by more than 1.

TABLE 1

Error Rate (All Regions)

| Method | aloe | cones | teddy | venus | reindeer | art | books | moebius |
|---|---|---|---|---|---|---|---|---|
| Approach 1 | 14.78 | 14.18 | 17.43 | 5.23 | 26.49 | 38.80 | 25.60 | 24.17 |
| Approach 2 | 14.86 | 14.76 | 16.80 | 4.60 | 25.60 | 23.5 | 25.38 | 24.29 |
| Approach 3 | 06.07 | 06.95 | 09.37 | 02.28 | 16.24 | 15.64 | 15.03 | 15.34 |
| Approach 4 | 03.79 | 04.59 | 07.45 | 01.98 | 12.26 | 16.14 | 13.41 | 11.41 |

Table 2 shows the percentage of pixels of the covered area that have a valid depth estimate.

TABLE 2

Coverage (All Regions)

| Method | aloe | cones | teddy | venus | reindeer | art | books | moebius |
|---|---|---|---|---|---|---|---|---|
| Approach 1 | 99.91 | 99.95 | 99.97 | 99.95 | 99.97 | 99.89 | 99.99 | 99.92 |
| Approach 2 | 99.95 | 99.90 | 99.96 | 99.97 | 99.94 | 89.47 | 99.92 | 99.98 |
| Approach 3 | 86.63 | 88.20 | 89.44 | 96.45 | 85.70 | 73.11 | 86.35 | 86.28 |
| Approach 4 | 84.31 | 87.01 | 87.22 | 96.42 | 81.85 | 70.14 | 85.52 | 84.20 |

Table 3 shows the error in the non-occluded covered area of the image.

TABLE 3

Error Rate (Non-Occluded Regions)

| Method | aloe | cones | teddy | venus | reindeer | art | books | moebius |
|---|---|---|---|---|---|---|---|---|
| Approach 1 | 06.21 | 04.99 | 09.26 | 02.23 | 13.34 | 24.49 | 17.00 | 14.58 |
| Approach 2 | 06.35 | 05.86 | 08.67 | 01.90 | 13.08 | 18.27 | 16.66 | 14.60 |
| Approach 3 | 04.17 | 04.74 | 07.23 | 01.49 | 11.37 | 11.75 | 13.88 | 12.36 |
| Approach 4 | 03.25 | 03.19 | 06.24 | 01.24 | 9.58 | 13.91 | 12.80 | 09.56 |

Table 4 shows the percentage of pixels of the non-occluded covered area that have a valid depth estimate.

TABLE 4

Coverage (Non-Occluded Regions)

| Method | aloe | cones | teddy | venus | reindeer | art | books | moebius |
|---|---|---|---|---|---|---|---|---|
| Approach 1 | 84.53 | 85.24 | 87.48 | 95.88 | 82.01 | 76.41 | 88.35 | 86.34 |
| Approach 2 | 84.53 | 85.24 | 87.47 | 95.88 | 82.00 | 76.26 | 88.35 | 86.32 |
| Approach 3 | 81.83 | 82.49 | 84.71 | 94.75 | 79.82 | 69.11 | 84.62 | 82.53 |
| Approach 4 | 81.28 | 82.75 | 83.88 | 95.06 | 78.78 | 67.82 | 84.39 | 81.85 |

Table 5 shows the percentage of pixels of the covered area differing from the ground truth by more than 1. The inputs are the results of the winner-takes-all adaptive window methods.

TABLE 5

Error Rate (All Regions)

| Method | aloe | cones | teddy | venus | reindeer | art | books | moebius |
|---|---|---|---|---|---|---|---|---|
| Approach 1 | 17.26 | 22.63 | 25.69 | 18.95 | 31.59 | 42.19 | 37.93 | 30.04 |
| Approach 2 | 18.36 | 23.92 | 30.36 | 31.45 | 34.40 | 39.54 | 37.02 | 28.16 |
| Approach 3 | 11.69 | 17.42 | 24.73 | 19.07 | 21.20 | 25.96 | 28.65 | 21.20 |
| Approach 4 | 05.08 | 10.55 | 12.70 | 10.08 | 15.14 | 21.38 | 22.55 | 13.78 |

Table 6 shows the percentage of pixels of the image area having a valid depth estimate. The inputs are the results of the winner-takes-all adaptive window methods.

TABLE 6

| | Coverage (All Regions) | | | | | | | |
|---|---|---|---|---|---|---|---|---|
| Method | aloe | cones | teddy | venus | reindeer | art | books | moebius |
| Approach 1 | 100.0 | 100.0 | 100.0 | 100.0 | 100.0 | 100.0 | 100.0 | 100.0 |
| Approach 2 | 99.41 | 99.57 | 99.48 | 99.81 | 99.23 | 99.64 | 99.57 | 99.80 |
| Approach 3 | 85.19 | 74.53 | 71.85 | 71.43 | 71.34 | 69.83 | 68.34 | 77.33 |
| Approach 4 | 81.30 | 73.24 | 71.37 | 79.98 | 71.69 | 67.93 | 67.62 | 72.74 |

Table 7 shows the percentage of pixels of the non-occluded covered area differing from the ground truth by more than 1. The inputs are the results of the winner-takes-all adaptive window methods.

TABLE 7

| | Error Rate (Non-Occluded Regions) | | | | | | | |
|---|---|---|---|---|---|---|---|---|
| Method | aloe | cones | teddy | venus | reindeer | art | books | moebius |
| Approach 1 | 08.00 | 14.39 | 18.17 | 16.27 | 18.81 | 27.85 | 30.79 | 21.00 |
| Approach 2 | 08.38 | 15.46 | 23.31 | 29.12 | 21.79 | 22.92 | 29.52 | 18.22 |
| Approach 3 | 06.34 | 12.55 | 20.44 | 17.37 | 13.39 | 16.00 | 24.21 | 14.50 |
| Approach 4 | 04.27 | 09.16 | 11.63 | 09.34 | 12.97 | 18.14 | 21.69 | 12.00 |

Table 8 shows the percentage of pixels of the non-occluded image area having a valid depth estimate. The inputs are the results of the winner-takes-all adaptive window methods.

TABLE 8

| | Coverage (Non-Occluded Regions) | | | | | | | |
|---|---|---|---|---|---|---|---|---|
| Method | aloe | cones | teddy | venus | reindeer | art | books | moebius |
| Approach 1 | 84.53 | 85.24 | 87.48 | 95.88 | 82.01 | 76.41 | 88.35 | 86.34 |
| Approach 2 | 84.20 | 85.01 | 87.29 | 95.79 | 81.82 | 76.21 | 88.18 | 86.22 |
| Approach 3 | 77.84 | 67.60 | 66.03 | 69.48 | 64.37 | 61.60 | 63.89 | 70.69 |
| Approach 4 | 78.37 | 69.62 | 68.84 | 78.81 | 69.44 | 64.88 | 66.46 | 70.76 |

Although the embodiments above have been described in detail, numerous variations and modifications will become apparent to those skilled in the art once the above disclosure is fully appreciated. It is intended that the following claims be interpreted to embrace all such variations and modifications.

What is claimed is:

1. A computer-implemented method, comprising:
   generating a plurality of initial depth maps for a first image of a stereo pair such that a given pixel p in the first image is associated with a first plurality of depth estimates, wherein the plurality of initial depth maps for the first image are generated using at least two separate and distinct techniques for depth estimation;
   generating a plurality of initial depth maps for a second image of the stereo pair such that a given pixel in the second image is associated with a second plurality of depth estimates, wherein the plurality of initial depth maps for the second image are generated using at least two separate and distinct techniques for depth estimation;
   generating a fused depth map for the first image that comprises a first plurality of fused depth estimates,
      wherein a given one of the first plurality of fused depth estimates that corresponds to the given pixel p in the first image is derived from the first plurality of depth estimates,
      wherein the given one of the first plurality of fused depth estimates is derived based on a smoothness parameter S(p) that represents a fraction of pixels in a neighborhood N(p) of the given pixel p in the first image that fall within (a) a predetermined depth proximity threshold δ and (b) a predetermined color proximity threshold τ, and
      wherein the given one of the first plurality of fused depth estimates is also derived based on a cross-validation parameter that indicates whether any of the first plurality of depth estimates is cross-validated by any of the second plurality of depth estimates; and
   generating a fused depth map for the second image that comprises the second plurality of fused depth estimates,
      wherein a given one of the second plurality of fused depth estimates that corresponds to the given pixel in the second image is derived from the second plurality of depth estimates,
      wherein the given one of the second plurality of fused depth estimates is derived based on a smoothness parameter that represents a fraction of pixels in a neighborhood of the given pixel in the second image that exhibit the relatively small variation in depth and the relatively small variation in color, and
      wherein the given one of the second plurality of fused depth estimates is also derived based on a cross-validation parameter that indicates whether any of the second plurality of depth estimates is cross-validated by any of the first plurality of depth estimates.

2. The method as recited in claim 1,
   wherein generating the fused depth map for the first image comprises: generating a reliability value for each of the first plurality of depth estimates, wherein a reliability value for a particular one of the first plurality of depth estimates depends on smoothness and cross-validation parameters for that depth estimate; and
   wherein generating the fused depth map for the second image comprises: generating a reliability value for each of the second plurality of depth estimates, wherein a reliability value for a particular one of the second plurality of depth estimates depends on smoothness and cross-validation parameters for that depth estimate.

3. The method as recited in claim 1, further comprising:
   assigning a weight to each of the first plurality of depth estimates for the first image; and
   assigning a weight to each of the second plurality of depth estimates for the second image.

4. The method as recited in claim 3, wherein the weight for each depth estimate is determined based on the smoothness and cross-validation parameters.

5. The method as recited in claim 4,
wherein generating the fused depth map for the first image comprises: for each pixel in the fused depth map for the first image, selecting a depth estimate having a highest weight; and
wherein generating the fused depth map for the second image comprises: for each pixel in the fused depth map for the second image, selecting a depth estimate having a highest weight.

6. The method of claim 1, wherein:
the smoothness parameter S(p) of the given pixel p in the first image is given by $$S(p) = 1 - \frac{1}{n} \sum_{j \in N(p)} \frac{1}{s_j} \sum_{k \in M(j)} D(j,k)(1 - C(j,k));$$

n is a count of pixels that are associated with one of the first plurality of depth estimates in the neighborhood N(p) of the given pixel p;
j ∈ N(p);
$s_j$ is a count of pixels that are associated with one of the first plurality of depth estimates in a modified neighborhood M(j) consisting of a set of four immediate pixel neighbors of pixel j;
k ∈ M(j);
D(j, k) = [|d(j)−d(k)|≥δ];
d(a) is a depth estimate associated with pixel a;
C(j, k) = [|R(j)−R(k)|≥τ]; and
R (j) is a color value associated with pixel a.

7. The method of claim 1, wherein:
the cross-validation parameter associated with an ith one of the first plurality of depth estimates $d_1^i$ associated with the given pixel p in the first image is given by $$V_p(d_1^i) = \begin{cases} 1 & \text{if } \left( \sum_{j=1}^{m} \sum_{q \to p} [|d_2^j(q) - d_1^i(p)| < \delta] \right) > 0 \\ 0 & \text{otherwise} \end{cases} ;$$

m is a quantity of depth estimates in the first plurality of depth estimates;
q → p denotes that a pixel q in the second image projects to the given pixel p in the first image via a jth one of the second plurality of depth estimates;
$d_2^j(q)$ is a jth one of the second plurality of depth estimates $d_2^j$ associated with the pixel q in the second image; and
$d_1^i(p)$ is a ith one of the first plurality of depth estimates $d_2^i$ associated with the given pixel p.

8. A system, comprising:
at least one processor; and
a memory coupled to the at least one processor, wherein the memory stores program instructions, wherein the program instructions are executable by the at least one processor to:
generate a plurality of initial depth maps for a first image of a stereo pair such that a given pixel p in the first image is associated with a first plurality of depth estimates, wherein the plurality of initial depth maps for the first image are generated using at least two separate and distinct techniques for depth estimation;
generate a plurality of initial depth maps for a second image of the stereo pair such that a given pixel in the second image is associated with a second plurality of depth estimates, wherein the plurality of initial depth maps for the second image are generated using at least two separate and distinct techniques for depth estimation;
generate a fused depth map for the first image that comprises a first plurality of fused depth estimates,
wherein a given one of the first plurality of fused depth estimates that corresponds to the given pixel p in the first image is derived from the first plurality of depth estimates,
wherein the given one of the first plurality of fused depth estimates is derived based on a smoothness parameter S(p) that represents a fraction of pixels in a neighborhood N(p) of the given pixel p in the first image that fall within (a) a predetermined depth proximity threshold δ and (b) a predetermined color proximity threshold τ, and
wherein the given one of the first plurality of fused depth estimates is also derived based on a cross-validation parameter that indicates whether any of the first plurality of depth estimates is cross-validated by any of the second plurality of depth estimates; and
generate a fused depth map for the second image that comprises the second plurality of fused depth estimates,
wherein a given one of the second plurality of fused depth estimates that corresponds to the given pixel in the second image is derived from the second plurality of depth estimates,
wherein the given one of the second plurality of fused depth estimates is derived based on a smoothness parameter that represents a fraction of pixels in a neighborhood of the given pixel in the second image that exhibit the relatively small variation in depth and the relatively small variation in color, and
wherein the given one of the second plurality of fused depth estimates is also derived based on a cross-validation parameter that indicates whether any of the second plurality of depth estimates is cross-validated by any of the first plurality of depth estimates.

9. The system as recited in claim 8,
wherein, in generating the fused depth map for the first image, the program instructions are executable by the at least one processor to: generate a reliability value for each of the first plurality of depth estimates, wherein a reliability value for a particular one of the first plurality of depth estimates depends on smoothness and cross-validation parameters for that depth estimate; and
wherein, in generating the fused depth map for the second image, the program instructions are executable by the at least one processor to: generate a reliability value for each of the second plurality of depth estimates, wherein a reliability value for a particular one of the second plurality of depth estimates depends on smoothness and cross-validation parameters for that depth estimate.

10. The system as recited in claim 8, wherein the program instructions are executable by the at least one processor to:
assign a weight to each of the first plurality of depth estimates for the first image; and
assign a weight to each of the second plurality of depth estimates for the second image.

11. The system as recited in claim 10, wherein the weight for each depth estimate is determined based on the smoothness and cross-validation parameters.

12. The system as recited in claim 11,
wherein, in generating the fused depth map for the first image, the program instructions are executable by the at least one processor to: select a depth estimate having a highest weight for each pixel in the fused depth map for the first image; and
wherein, in generating the fused depth map for the second image, the program instructions are executable by the at least one processor to: select a depth estimate having a highest weight for each pixel in the fused depth map for the second image.

13. The system of claim 8, wherein:
the smoothness parameter $S(p)$ of the given pixel p in the first image is given by $$S(p) = 1 - \frac{1}{n} \sum_{j \in N(p)} \frac{1}{s_j} \sum_{k \in M(j)} D(j,k)(1 - C(j,k));$$

n is a count of pixels that are associated with one of the first plurality of depth estimates in the neighborhood N(p) of the given pixel p;
$j \in N(P)$;
$s_j$ is a count of pixels that are associated with one of the first plurality of depth estimates in a modified neighborhood M(j) consisting of a set of four immediate pixel neighbors of pixel j;
$k \in M(j)$;
$D(j,k) = [|d(j) - d(k)| \geq \delta]$;
d(a) is a depth estimate associated with pixel a;
$C(j,k) = [|R(j) - R(k)| \geq \tau]$; and
R(j) is a color value associated with pixel a.

14. The system of claim 8, wherein:
the cross-validation parameter associated with an ith one of the first plurality of depth estimates $d_1^i$ associated with the given pixel p in the first image is given by $$V_p(d_1^i) = \begin{cases} 1 & \text{if } \left( \sum_{j=1}^{m} \sum_{q \to p} [|d_2^j(q) - d_1^i(p)| < \delta] \right) > 0 \\ 0 & \text{otherwise} \end{cases};$$

m is a quantity of depth estimates in the first plurality of depth estimates;
$q \to p$ denotes that a pixel q in the second image projects to the given pixel p in the first image via a jth one of the second plurality of depth estimates;
$d_2^j(q)$ is a jth one of the second plurality of depth estimates $d_2^j$ associated with the pixel q in the second image; and
$d_1^i(p)$ is a ith one of the first plurality of depth estimates $d_2^i$ associated with the given pixel p.

15. A non-transitory computer-readable storage medium storing program instructions computer-executable to perform:
generating a plurality of initial depth maps for a first image of a stereo pair such that a given pixel p in the first image is associated with a first plurality of depth estimates, wherein the plurality of initial depth maps for the first image are generated using at least two separate and distinct techniques for depth estimation;
generating a plurality of initial depth maps for a second image of the stereo pair such that a given pixel in the second image is associated with a second plurality of depth estimates, wherein the plurality of initial depth maps for the second image are generated using at least two separate and distinct techniques for depth estimation;
generating a fused depth map for the first image that comprises a first plurality of fused depth estimates,
wherein a given one of the first plurality of fused depth estimates that corresponds to the given pixel p in the first image is derived from the first plurality of depth estimates,
wherein the given one of the first plurality of fused depth estimates is derived based on a smoothness parameter S(p) that represents a fraction of pixels in a neighborhood N(p) of the given pixel p in the first image that fall within (a) a predetermined depth proximity threshold δ and (b) a predetermined color proximity threshold τ, and
wherein the given one of the first plurality of fused depth estimates is also derived based on a cross-validation parameter that indicates
whether any of the first plurality of depth estimates is cross-validated by any of the second plurality of depth estimates; and
generating a fused depth map for the second image that comprises the second plurality of fused depth estimates,
wherein a given one of the second plurality of fused depth estimates that corresponds to the given pixel in the second image is derived from the second plurality of depth estimates,
wherein the given one of the second plurality of fused depth estimates is derived based on a smoothness parameter that represents a fraction of pixels in a neighborhood of the given pixel in the second image that exhibit the relatively small variation in depth and the relatively small variation in color, and
wherein the given one of the second plurality of fused depth estimates is also derived based on a cross-validation parameter that indicates whether any of the second plurality of depth estimates is cross-validated by any of the first plurality of depth estimates.

16. The non-transitory computer-readable storage medium as recited in claim 15,
wherein generating the fused depth map for the first image comprises: generating a reliability value for each of the first plurality of depth estimates, wherein a reliability value for a particular one of the first plurality of depth estimates depends on smoothness and cross-validation parameters for that depth estimate; and
wherein generating the fused depth map for the second image comprises: generating a reliability value for each of the second plurality of depth estimates, wherein a reliability value for a particular one of the second plurality of depth estimates depends on smoothness and cross-validation parameters for that depth estimate.

17. The non-transitory computer-readable storage medium as recited in claim 15, wherein the program instructions are computer-executable to further perform:
assigning a weight to each of the first plurality of depth estimates for the first image; and
assigning a weight to each of the second plurality of depth estimates for the second image;
wherein each of the weights is determined based on smoothness and cross-validation parameters.

18. The non-transitory computer-readable storage medium as recited in claim 17, wherein generating the fused depth map for the first image comprises: for each pixel in the fused depth map for the first image, selecting a depth estimate having a highest weight; and wherein generating the fused depth map for the second image comprises: for each pixel in the fused depth map for the second image, selecting a depth estimate having a highest weight.

19. The non-transitory computer-readable storage medium of claim 15, wherein the smoothness parameter $S(p)$ of the given pixel p in the first image is given by $$S(p) = 1 - \frac{1}{n} \sum_{j \in N(p)} \frac{1}{s_j} \sum_{k \in M(j)} D(j,k)(1 - C(j,k));$$

n is a count of pixels that are associated with one of the first plurality of depth estimates in the neighborhood $N(p)$ of the given pixel p;

$j \in N(p)$;

$s_j$ is a count of pixels that are associated with one of the first plurality of depth estimates in a modified neighborhood $M(j)$ consisting of a set of four immediate pixel neighbors of pixel j;

$k \in M(j)$;

$D(j, k) = [|d(j) - d(k)| \geq \delta]$;

d(a) is a depth estimate associated with pixel a;

$C(j, k) = [|R(j) - R(k)| \geq \tau]$; and

R(j) is a color value associated with pixel a.

20. The non-transitory computer-readable storage medium of claim 15, wherein the cross-validation parameter associated with an ith one of the first plurality of depth estimates $d_1^i$ associated with the given pixel p in the first image is given by $$V_p(d_1^i) = \begin{cases} 1 & \text{if } \left( \sum_{j=1}^{m} \sum_{q \to p} [|d_2^j(q) - d_1^i(p)| < \delta] \right) > 0 \\ 0 & \text{otherwise} \end{cases};$$

m is a quantity of depth estimates in the first plurality of depth estimates;

$q \to p$ denotes that a pixel q in the second image projects to the given pixel p in the first image via a jth one of the second plurality of depth estimates;

$d_2^j(q)$ is a jth one of the second plurality of depth estimates $d_2^j$ associated with the pixel q in the second image, $d_1^i(p)$ is a ith one of the first plurality of depth estimates $d_2^i$ associated with the given pixel p.

* * * * *